United States Patent
Trcková et al.

(10) Patent No.: US 12,534,448 B2
(45) Date of Patent: Jan. 27, 2026

(54) SOLID STATE FORM OF LEMBOREXANT

(71) Applicant: TAPI CZECH INDUSTRIES S.R.O., Opava-Komarov (CZ)

(72) Inventors: Zuzana Trcková, Ostrava (CZ); Adéla Bártová, Ostrava-Michalkovice (CZ); Pavel Kolesa, Hlubocec (CZ); Alexandr Jegorov, Dobra Voda (CZ)

(73) Assignee: TAPI CZECH INDUSTRIES S.R.O, Opava-Komarov (CZ)

(*) Notice: Subject to any disclaimer, the term of this patent is extended or adjusted under 35 U.S.C. 154(b) by 701 days.

(21) Appl. No.: 17/777,663

(22) PCT Filed: Dec. 10, 2020

(86) PCT No.: PCT/US2020/064156
§ 371 (c)(1),
(2) Date: May 18, 2022

(87) PCT Pub. No.: WO2021/119223
PCT Pub. Date: Jun. 17, 2021

(65) Prior Publication Data
US 2024/0010629 A1    Jan. 11, 2024

Related U.S. Application Data

(60) Provisional application No. 62/946,504, filed on Dec. 11, 2019.

(51) Int. Cl.
*C07D 401/12* (2006.01)
*C07C 55/10* (2006.01)

(52) U.S. Cl.
CPC ............ *C07D 401/12* (2013.01); *C07C 55/10* (2013.01); *C07B 2200/13* (2013.01)

(58) Field of Classification Search
CPC .................................................... C07D 401/12
USPC ........................................................ 514/269
See application file for complete search history.

(56) References Cited

U.S. PATENT DOCUMENTS

2012/0095031 A1    4/2012   Terauchi et al.
2020/0190060 A1*   6/2020   Chen ................... C07D 401/12

FOREIGN PATENT DOCUMENTS

WO    WO-2017197160 A1 * 11/2017   .............. A61P 43/00
WO       2019024845 A1    2/2019

OTHER PUBLICATIONS

Craig Ritchie, Lemborexant in subjects with ISWRD and Alzheimer's, NHS Health Research Authority, Feb. 27, 2018, REC Opinion 18/SS/0002, https://www.hra.nhs.uk/planning-and-improving-research/application-summaries/research-summaries/lemborexant-in-subjects-with-iswrd-and-alzheimers/ (Year: 2018).*
Eisai Co., Ltd., Eisai Presents New Data On Lemborexant for Treatment of Irregular Sleep-Wake Rhythm Disorder in Patients With Alzheimer's Disease at the 11th Clinical Trials in Alzheimer's Disease Conference, Eisai Global News Release, 2018, No. 18-93 (Year: 2018).*
Mayo Clinic, Lemborexant (oral route), 2025, https://www.mayoclinic.org/drugs-supplements/lemborexant-oral-route/description/drg-20487084 (Year: 2025).*
Saal C. et al., "Pharmaceutical salts: A summary on doses of salt formers from the Orange Book", European Journal of Pharmaceutical Sciences, vol. 49, No. 4, Jun. 5, 2013, pp. 614-623, XP028676562.
Aakeroy, Christer B., et al., "Cocrystal or Salt: Does It Really Matter?", Molecular Pharmaceutics, vol. 4, No. 3, Jun. 1, 2007, pp. 317-322, XP055249001.
Eun Hee Lee, "A practical guide to pharmaceutical polymorph screening & selection", Asian Journal of Pharmaceutical Sciences, vol. 9, No. 4, Mar. 16, 2014, pp. 163-175, XP055260946.
International Search Report and Written Opinion of the International Searching Authority issued in corresponding application PCT/US2020/064156 mailed Feb. 23, 2021 (16 pages).
Notice of Reasons for Rejection issued in corresponding Japanese Application No. 2022-535835 mailed Oct. 15, 2024, together with English language translation (14 pages).

* cited by examiner

*Primary Examiner* — Jeffrey H Murray
*Assistant Examiner* — Rilla Marie Samsell
(74) *Attorney, Agent, or Firm* — Carter, DeLuca & Farrell LLP (57) ABSTRACT

The present disclosure encompasses Lemborexant:succinic acid, a solid state form thereof, processes for preparation thereof, and pharmaceutical compositions thereof.

12 Claims, 7 Drawing Sheets

Figure 1. A characteristic X-ray powder diffraction pattern (XRPD) of Form 1 of Lemborexant: succinic acid.

Figure 2. A characteristic solid state $^{13}$C NMR spectrum of form 1 of Lemborexant: succinic acid co-crystal (full range 200-0 ppm).

Figure 3. A characteristic solid state $^{13}$C NMR spectrum of form 1 of Lemborexant: succinic acid co-crystal (200-100 ppm).

Figure 4. A characteristic solid state $^{13}$C NMR spectrum of form 1 of Lemborexant: succinic acid co-crystal (100-0 ppm).

Figure 5. A characteristic $^{15}$N CP/MAS NMR spectrum of form 1 of Lemborexant: succinic acid co-crystal (400-0 ppm).

Figure 6. A characteristic FTIR spectrum of form 1 of Lemborexant: succinic acid co-crystal (full range).

Figure 7. A characteristic FTIR spectrum of form 1 of Lemborexant: succinic acid co-crystal (1800-550 cm$^{-1}$).

FT-IR peaks:
573, 583, 608, 639, 694, 745, 757, 782, 793, 843, 870, 893, 909, 920, 954, 989, 1009, 1021, 1040, 1047, 1118, 1173, 1187, 1222, 1243, 1251, 1275, 1291, 1326, 1350, 1376, 1395, 1459, 1484, 1549, 1585, 1600, 1616, 1689, 1709, 2361, 2542, 2735, 2959, 3064, 3302 cm$^{-1}$ ± 4 cm$^{-1}$

SOLID STATE FORM OF LEMBOREXANT

CROSS REFERENCE TO RELATED APPLICATIONS

This application is a National Stage of, and claims priority to and the benefit of, International Patent Application No. PCT/US2020/064156 filed Dec. 10, 2020 which, in turn, claims the benefit of and priority to, U.S. Provisional Application No. 62/946,504, filed Dec. 11, 2019, the entire disclosures of each of which are incorporated by reference herein.

FIELD OF THE DISCLOSURE

The present disclosure encompasses Lemborexant:succinic acid, a solid state form thereof, processes for preparation thereof, and pharmaceutical compositions thereof.

BACKGROUND OF THE DISCLOSURE

Lemborexant, (1R,2S)-2-[[(2,4-Dimethylpyrimidin-5-yl)oxy]methyl]-2-(3-fluoro phenyl)-N-(5-fluoropyridin-2-yl)cyclopropanecarboxamide, has the following chemical structure:

Lemborexant is an investigational sleep-wake regulation agent, and is developed for the treatment of sleep-wake disorders, including insomnia and Irregular Sleep-Wake Rhythm Disorder (ISWRD) associated with Alzheimer's disease/dementia.

The compound is described in International Publication No. WO 2012/039371. Processes for preparation of Lemborexant are described in International Publication No. WO 2013/123240. A crystalline form of Lemborexant is described in International Publication No. WO 2019/024845.

Polymorphism, the occurrence of different crystalline forms, is a property of some molecules and molecular complexes. A single molecule may give rise to a variety of polymorphs having distinct crystal structures and physical properties like melting point, thermal behaviors (e.g., measured by thermogravimetric analysis ("TGA"), or differential scanning calorimetry ("DSC")), X-ray diffraction (XRD) pattern, infrared absorption fingerprint, and solid state ($^{13}$C) NMR spectrum. One or more of these techniques may be used to distinguish different polymorphic forms of a compound.

Different salts and solid state forms (including solvated forms) of an active pharmaceutical ingredient may possess different properties. Such variations in the properties of different salts and solid state forms and solvates may provide a basis for improving formulation, for example, by facilitating better processing or handling characteristics, changing the dissolution profile in a favorable direction, or improving stability (polymorph as well as chemical stability) and shelf-life. These variations in the properties of different salts and solid state forms may also offer improvements to the final dosage form, for instance, if they serve to improve bioavailability. Different salts and solid state forms and solvates of an active pharmaceutical ingredient may also give rise to a variety of polymorphs or crystalline forms, which may in turn provide additional opportunities to assess variations in the properties and characteristics of a solid active pharmaceutical ingredient.

Discovering new solid state forms and solvates of a pharmaceutical product may yield materials having desirable processing properties, such as ease of handling, ease of processing, storage stability, and ease of purification or as desirable intermediate crystal forms that facilitate conversion to other polymorphic forms. New solid state forms of a pharmaceutically useful compound can also provide an opportunity to improve the performance characteristics of a pharmaceutical product. It enlarges the repertoire of materials that a formulation scientist has available for formulation optimization, for example by providing a product with different properties, including a different crystal habit, higher crystallinity, or polymorphic stability, which may offer better processing or handling characteristics, improved dissolution profile, or improved shelf-life (chemical/physical stability). For at least these reasons, there is a need for additional solid state forms (including solvated forms) of Lemborexant.

SUMMARY OF THE DISCLOSURE

The present disclosure provides crystalline Lemborexant:succinic acid and a solid state form thereof. The present disclosure also provides processes for preparation thereof, and pharmaceutical compositions thereof. These crystalline polymorphs can be used to prepare other solid state forms of Lemborexant, Lemborexant salts and their solid state forms.

The present disclosure also provides uses of the said solid state forms of Lemborexant in the preparation of other solid state forms of Lemborexant or salts thereof.

The present disclosure provides crystalline Lemborexant:succinic acid or the described solid state form thereof for use in medicine, including for the treatment of sleep-wake disorders, including insomnia and/or Irregular Sleep-Wake Rhythm Disorder (ISWRD) associated with Alzheimer's disease/dementia.

The present disclosure also encompasses the use of crystalline Lemborexant:succinic acid or the described solid state form thereof of the present disclosure for the preparation of pharmaceutical compositions and/or formulations.

In another aspect, the present disclosure provides pharmaceutical compositions comprising crystalline Lemborexant:succinic acid or the described solid state form thereof according to the present disclosure.

The present disclosure includes processes for preparing the above mentioned pharmaceutical compositions. The processes include combining any one or a combination of the crystalline Lemborexant:succinic acid or the described solid state form thereof with at least one pharmaceutically acceptable excipient.

The crystalline Lemborexant:succinic acid or the described solid state form thereof as defined herein and the pharmaceutical compositions or formulations of the crystalline polymorph of Lemborexant may be used as medicaments, such as for the treatment of sleep-wake disorders, including insomnia and/or Irregular Sleep-Wake Rhythm Disorder (ISWRD) associated with Alzheimer's disease/dementia.

The present disclosure also provides methods of treating sleep-wake disorders, including insomnia and Irregular Sleep-Wake Rhythm Disorder (ISWRD) associated with Alzheimer's disease/dementia, by administering a therapeutically effective amount of any one or a combination of the crystalline polymorphs of Lemborexant:succinic acid of the present disclosure, or at least one of the above pharmaceutical compositions, to a subject suffering from sleep-wake disorders, including insomnia and Irregular Sleep-Wake Rhythm Disorder (ISWRD) associated with Alzheimer's disease/dementia, or otherwise in need of the treatment.

The present disclosure also provides uses of crystalline polymorphs of Lemborexant: succinic acid of the present disclosure, or at least one of the above pharmaceutical compositions, for the manufacture of medicaments for treating e.g. sleep-wake disorders, including insomnia and Irregular Sleep-Wake Rhythm Disorder (ISWRD) associated with Alzheimer's disease/dementia.

DETAILED DESCRIPTION OF THE DISCLOSURE

The present disclosure encompasses crystalline Lemborexant:succinic acid, particularly Lemborexant:succinic acid cocrystal, and solid state form thereof, processes for preparation thereof, and pharmaceutical compositions thereof.

Solid state properties of Lemborexant:succinic acid and crystalline polymorphs thereof can be influenced by controlling the conditions under which Lemborexant:succinic acid and crystalline polymorphs thereof are obtained in solid form.

A solid state form (or polymorph) may be referred to herein as polymorphically pure or as substantially free of any other solid state (or polymorphic) forms. As used herein in this context, the expression "substantially free of any other forms" will be understood to mean that the solid state form contains about 20% (w/w) or less, about 10% (w/w) or less, about 5% (w/w) or less, about 2% (w/w) or less, about 1% (w/w) or less, or about 0% of any other forms of the subject compound as measured, for example, by XRPD. Thus, a crystalline polymorph of Lemborexant described herein as substantially free of any other solid state forms would be understood to contain greater than about 80% (w/w), greater than about 90% (w/w), greater than about 95% (w/w), greater than about 98% (w/w), greater than about 99% (w/w), or about 100% of the subject crystalline polymorph of Lemborexant. In some embodiments of the disclosure, the described crystalline polymorph of Lemborexant may contain from about 1% to about 20% (w/w), from about 5% to about 20% (w/w), or from about 5% to about 10% (w/w) of one or more other crystalline polymorph of the same Lemborexant.

Depending on which other crystalline polymorphs a comparison is made, the crystalline polymorphs of Lemborexant:succinic acid of the present disclosure may have advantageous properties selected from at least one of the following: chemical purity, flowability, solubility, dissolution rate, morphology or crystal habit, stability, such as chemical stability as well as thermal and mechanical stability with respect to polymorphic conversion, stability towards dehydration and/or storage stability, low content of residual solvent, a lower degree of hygroscopicity, flowability, and advantageous processing and handling characteristics such as compressibility and bulk density.

A solid state form, such as a crystal form or an amorphous form, may be referred to herein as being characterized by graphical data "as depicted in" or "as substantially depicted in" a Figure. Such data include, for example, powder X-ray diffractograms and solid state NMR spectra. As is well-known in the art, the graphical data potentially provides additional technical information to further define the respective solid state form (a so-called "fingerprint") which cannot necessarily be described by reference to numerical values or peak positions alone. In any event, the skilled person will understand that such graphical representations of data may be subject to small variations, e.g., in peak relative intensities and peak positions due to certain factors such as, but not limited to, variations in instrument response and variations in sample concentration and purity, which are well known to the skilled person. Nonetheless, the skilled person would readily be capable of comparing the graphical data in the Figures herein with graphical data generated for an unknown crystal form and confirm whether the two sets of graphical data are characterizing the same crystal form or two different crystal forms. A crystal form of Lemborexant referred to herein as being characterized by graphical data "as depicted in" or "as substantially depicted in" a Figure will thus be understood to include any crystal forms of Lemborexant characterized with the graphical data having such small variations, as are well known to the skilled person, in comparison with the Figure.

As used herein, and unless stated otherwise, the term "anhydrous" in relation to crystalline forms of Lemborexant, relates to a crystalline form of Lemborexant which does not include any crystalline water (or other solvents) in a defined, stoichiometric amount within the crystal. Moreover, an "anhydrous" form would generally not contain more than 1% (w/w), of either water or organic solvents as measured for example by TGA.

The term "solvate," as used herein and unless indicated otherwise, refers to a crystal form that incorporates a solvent in the crystal structure. When the solvent is water, the solvate is often referred to as a "hydrate." The solvent in a solvate may be present in either a stoichiometric or in a non-stoichiometric amount.

"Co-Crystal" or "Co-crystal" as used herein is defined as a crystalline material including two or more molecules in the same crystalline lattice and associated by non-ionic and non-covalent bonds. In some embodiments, the co-crystal includes two or more molecules which are in natural state.

As used herein, the term "isolated" in reference to crystalline polymorph of Lemborexant:succinic acid of the present disclosure corresponds to a crystalline polymorph of Lemborexant:succinic acid that is physically separated from the reaction mixture in which it is formed.

As used herein, unless stated otherwise, the XRPD measurements are taken using copper Kα radiation wavelength 1.54187 Å. XRPD peaks reported herein are measured using CuK α radiation, λ=1.54187 Å, typically at a temperature of 25±3° C.

As used herein, unless stated otherwise, $^{13}$C NMR measurements are obtained at 125 MHz.

As used herein, unless stated otherwise, $^{15}$N NMR measurements are obtained at 50.7 MHz.

A thing, e.g., a reaction mixture, may be characterized herein as being at, or allowed to come to "room temperature" or "ambient temperature", often abbreviated as "RT." This means that the temperature of the thing is close to, or the same as, that of the space, e.g., the room or fume hood, in which the thing is located. Typically, room temperature is from about 20° C. to about 30° C., or about 22° C. to about 27° C., or about 25° C.

The amount of solvent employed in a chemical process, e.g., a reaction or crystallization, may be referred to herein as a number of "volumes" or "vol" or "V." For example, a material may be referred to as being suspended in 10 volumes (or 10 vol or 10V) of a solvent. In this context, this expression would be understood to mean milliliters of the solvent per gram of the material being suspended, such that suspending a 5 grams of a material in 10 volumes of a solvent means that the solvent is used in an amount of 10 milliliters of the solvent per gram of the material that is being suspended or, in this example, 50 mL of the solvent. In another context, the term "v/v" may be used to indicate the number of volumes of a solvent that are added to a liquid mixture based on the volume of that mixture. For example, adding solvent X (1.5 v/v) to a 100 ml reaction mixture would indicate that 150 mL of solvent X was added.

A process or step may be referred to herein as being carried out "overnight." This refers to a time interval, e.g., for the process or step, that spans the time during the night, when that process or step may not be actively observed. This time interval is from about 8 to about 20 hours, or about 10-18 hours, in some cases about 16 hours.

As used herein, the term "reduced pressure" refers to a pressure that is less than atmospheric pressure. For example, reduced pressure is about 10 mbar to about 50 mbar.

As used herein and unless indicated otherwise, the term "ambient conditions" refer to atmospheric pressure and a temperature of 22-24° C.

As used herein, crystalline Lemborexant:succinic acid is a distinct molecular species. Crystalline Lemborexant:succinic acid may be a co-crystal of Lemborexant and succinic acid. Alternatively crystalline Lemborexant:succinic acid may be a salt. In any aspect or embodiment of the disclosure herein, a reference to crystalline Lemborexant:succinic acid particularly refers to a co-crystal of Lemborexant and succinic acid.

In embodiments the molar ratio between the active pharmaceutical ingredient (Lemborexant) and the coformer (succinic acid) is about 1:1.5 and 1.5:1, in some embodiments between 1:1.25 and 1.25:1, in other embodiments about 1:1

Figure 1:
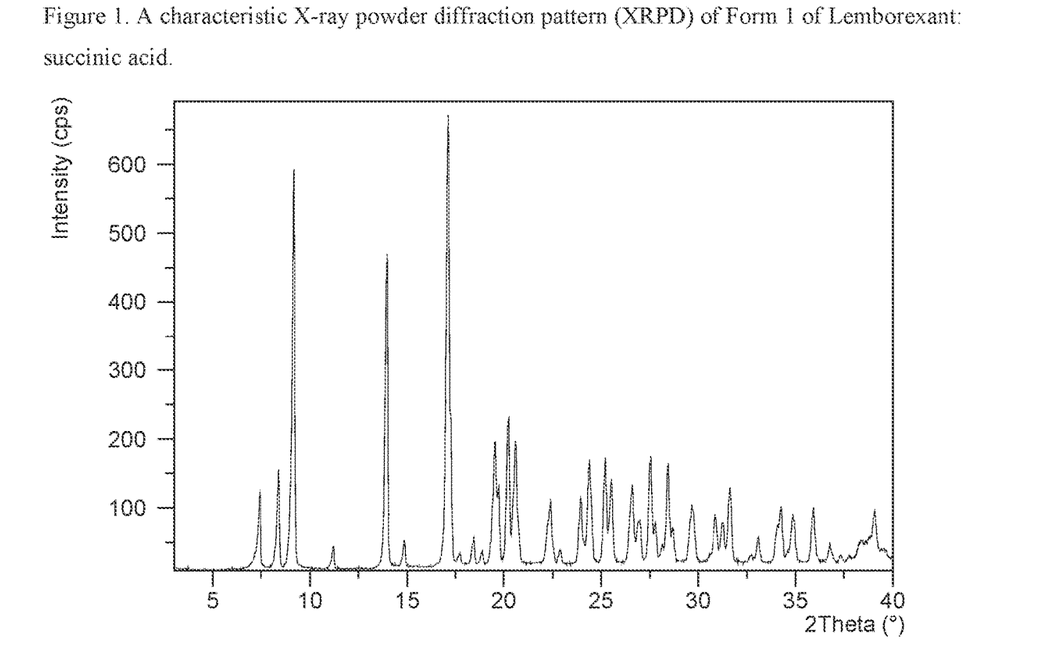
FIG. 1 shows a characteristic X-ray powder diffraction pattern (XRPD) of Form 1 of Lemborexant:succinic acid.
Figure 2:
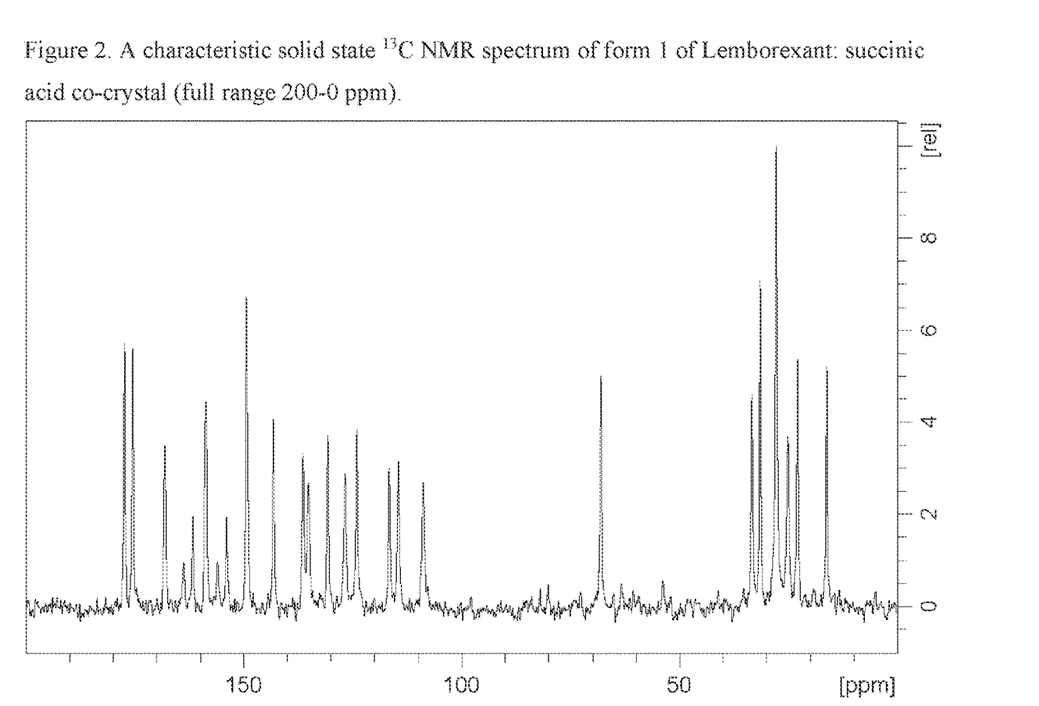
FIG. 2 shows a characteristic solid state $^{13}C$ NMR spectrum of form 1 of Lemborexant:succinic acid co-crystal (full range 200-0 ppm)
Figure 3:
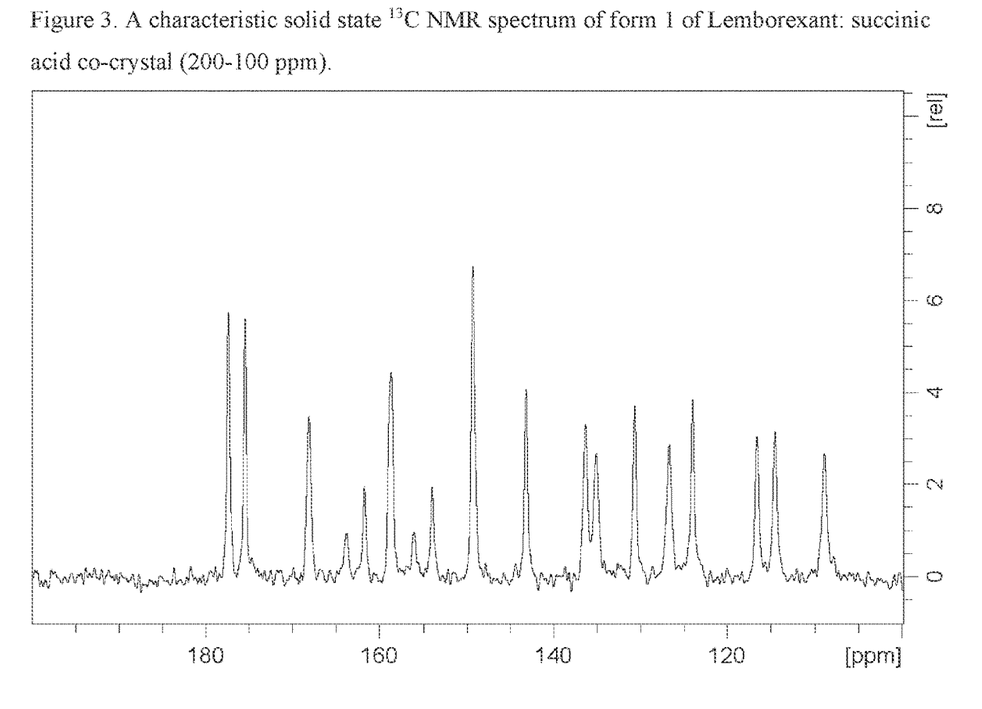
FIG. 3 shows a characteristic solid state $^{13}C$ NMR spectrum of form 1 of Lemborexant:succinic acid co-crystal (200-100 ppm)
Figure 4:
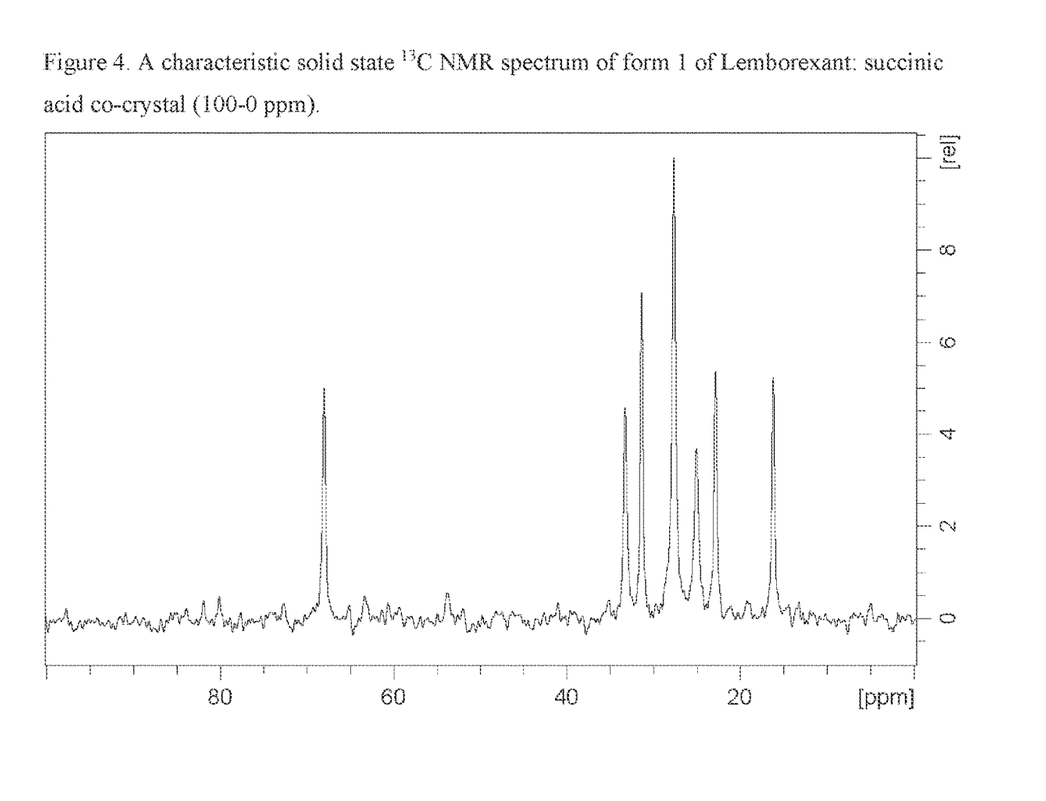
FIG. 4 shows a characteristic solid state $^{13}C$ NMR spectrum of form 1 of Lemborexant:succinic acid co-crystal (100-0 ppm)
Figure 5:
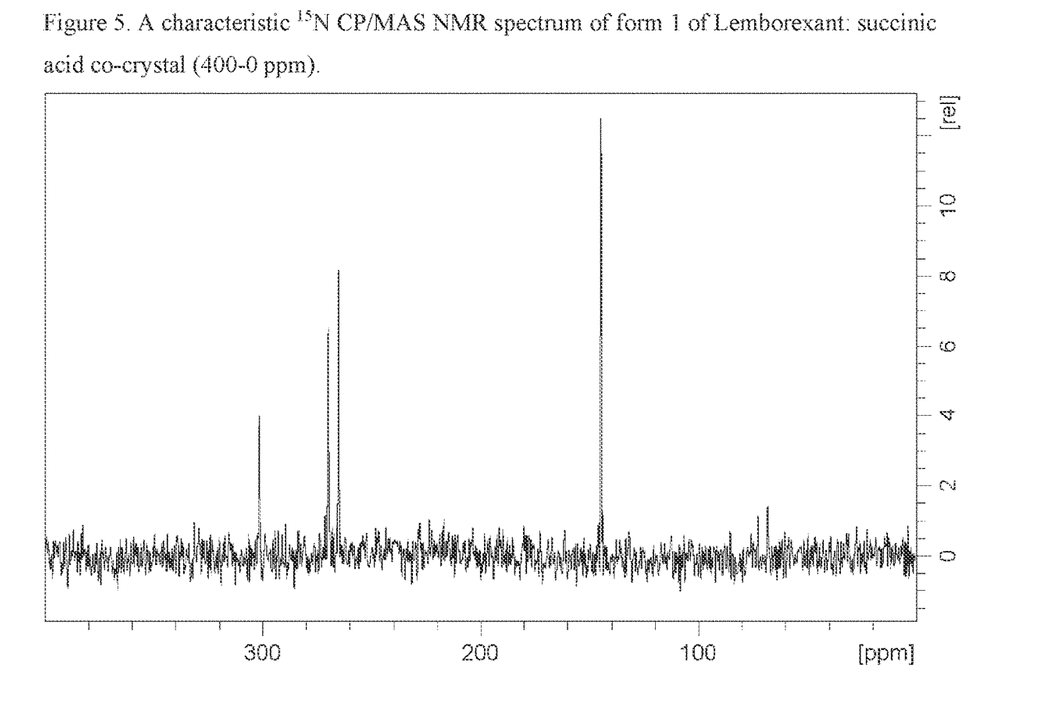
FIG. 5 shows a characteristic $^{15}N$ CP/MAS NMR spectrum of form 1 of Lemborexant:succinic acid co-crystal (400-0 ppm)
Figure 6:
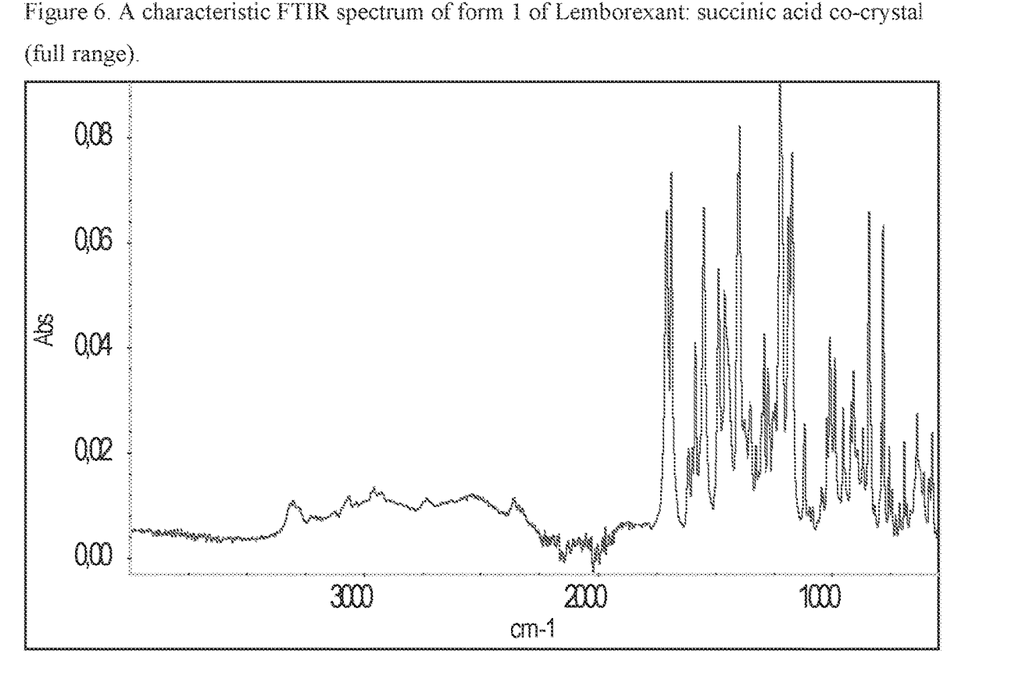
FIG. 6 shows a characteristic FTIR spectrum of form 1 of Lemborexant:succinic acid co-crystal (full range)
Figure 7:
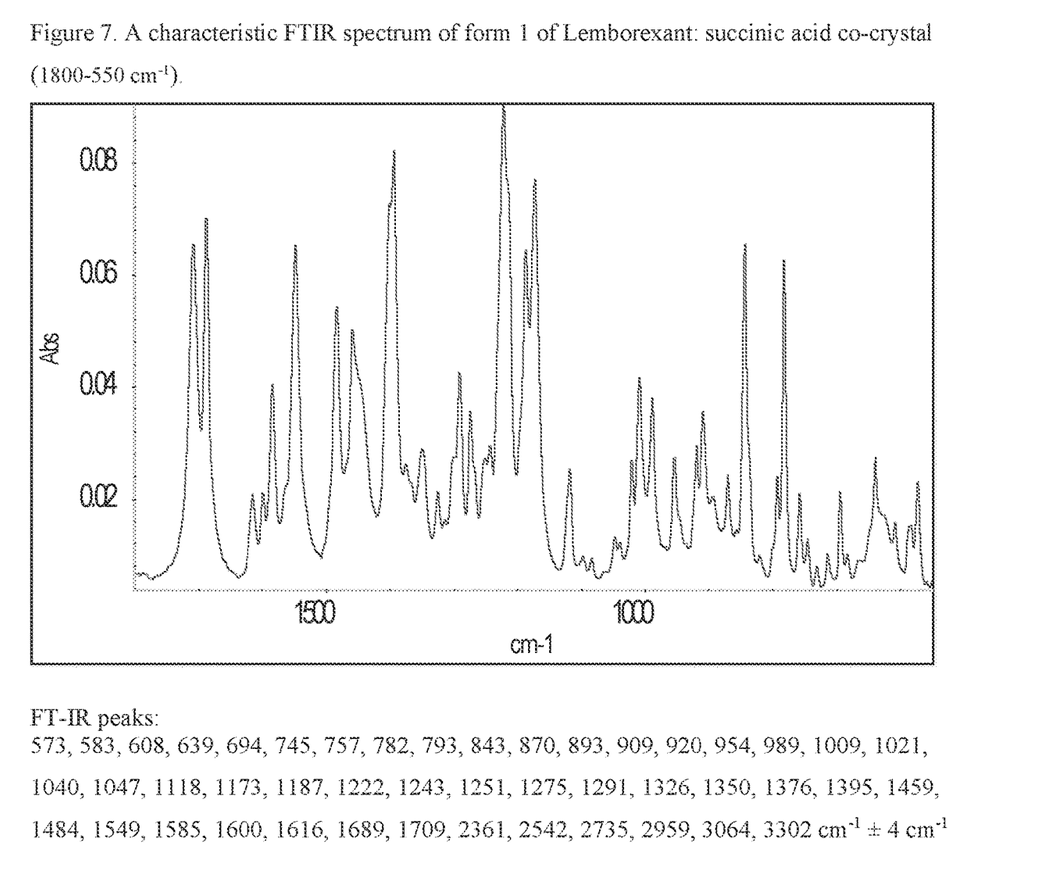
FIG. 7 shows a characteristic FTIR spectrum of form 1 of Lemborexant:succinic acid co-crystal (1800-550 cm-1)

The present disclosure includes a crystalline polymorph of Lemborexant:succinic acid, designated Form 1. The crystalline Form 1 of Lemborexant:succinic acid may be characterized by data selected from one or more of the following: an X-ray powder diffraction pattern substantially as depicted in FIG. 1; an X-ray powder diffraction pattern having peaks at 7.4, 8.4, 9.2, 14.0 and 17.1 degrees 2-theta±0.2 degrees 2-theta; a solid state $^{13}$C NMR spectrum with characteristic peaks at 177.4, 158.6, 149.3, 124.0 and 114.5 ppm±0.2 ppm; a solid state $^{13}$C NMR spectrum having the following chemical shift absolute differences from reference peak at 108.8 ppm±1 ppm: 68.6, 49.8, 40.5, 15.2 and 5.7 ppm±0.1 ppm; a solid state $^{13}$C NMR spectrum substantially as depicted in FIG. 2, 3 or 4; a solid state $^{15}$N NMR spectrum with characteristic peaks at 144.6, 265.1, 269.8 and 301.6 ppm±0.2 ppm; a solid state $^{15}$N NMR spectrum substantially as depicted in FIG. 5; and combinations of these data.

Crystalline Form 1 of Lemborexant:succinic acid may be further characterized by an X-ray powder diffraction pattern having peaks at 7.4, 8.4, 9.2, 14.0 and 17.1 degrees 2-theta±degrees 2-theta, and also having any one, two, three, four or five additional peaks selected from 11.2, 14.9, 18.4, 20.6 and 24.4 degrees 2-theta±0.2 degrees 2-theta.

Crystalline Form 1 of Lemborexant:succinic acid may be alternatively characterized by an X-ray powder diffraction pattern having peaks at 7.4, 8.4, 9.2, 11.2, 14.0, 14.9, 17.1, 18.4, and 24.4 degrees 2-theta±0.2 degrees 2-theta, or by an X-ray powder diffraction pattern having peaks at 7.4, 8.4, 9.2, 11.2, 14.0, 14.9, 17.1, 17.7, 18.4, 18.9, 19.5, 19.7, 20.2, 20.6, 22.4, 22.9, 24.0, 24.4, 25.2, 25.5, 26.5, 27.0, 27.5, 27.8, 28.4, 28.7 and 29.7, degrees 2-theta±0.2 degrees 2-theta.

Alternatively, or in addition to the above, Lemborexant:succinic acid form 1 may be characterized by the following unit cell data:

a=10.528 Å
b=23.814 Å
c=5.1173 Å
β=90.695°
cell volume 1283 Å$^3$
Space group P2$_1$ In one embodiment of the present disclosure, crystalline Form 1 of Lemborexant: succinic acid is isolated.

Crystalline Form 1 of Lemborexant:succinic acid may be anhydrous.

Crystalline Form 1 of Lemborexant:succinic acid may be characterized by each of the above characteristics alone or by all possible combinations, e.g., an XRPD pattern having peaks at 7.4, 8.4, 9.2, 14.0 and 17.1 degrees 2-theta±0.2 degrees 2-theta; an XRPD pattern as depicted in FIG. 1, and combinations thereof.

The above crystalline polymorph can be used to prepare other crystalline polymorphs of Lemborexant, Lemborexant salts and their solid state forms.

The present disclosure encompasses a process for preparing other solid state forms of Lemborexant, Lemborexant salts and/or their solid state forms thereof. The process includes preparing Lemborexant:succinic acid of the present disclosure, and converting it to Lemborexant or said other salt thereof.

The present disclosure provides the above described crystalline polymorphs of Lemborexant:succinic acid for use in the preparation of pharmaceutical compositions comprising Lemborexant:succinic acid and/or crystalline polymorphs thereof.

In one aspect, the process comprises crystallising Lemborexant:succinic acid from a solution comprising Lemborexant and succinic acid in at least one organic solvent, optionally by cooling and/or addition of an antisolvent. The solvent and antisolvents may be any of the options described below.

In another aspect the process includes: (a) providing a solution of Lemborexant in one or more polar solvents; (b)

adding succinic acid optionally in the form of a suspension; (c) cooling the reaction mixture; (d) adding an anti-solvent; and (e) optionally isolating Form 1 of Lemborexant:succinic acid.

In embodiments the polar solvent in step (a) may be a ketone, such as acetone.

In embodiments step (a) is performed while heating. In embodiments to a temperature of about 40° C. to about 60° C.

In embodiments succinic acid is added in the form of a suspension in a polar solvent such as acetone.

In embodiments, in step (c) the reaction mixture is cooled to a temperature of about 0° C. to about 10° C.

In embodiments the anti-solvent in step (d) may be an aprotic solvent, such as an alkane, such as hexane.

In embodiments after step (d) a suspension is formed.

In a further embodiment the process includes (a) providing a solution of Lemborexant in acetone; (b) adding succinic acid optionally in the form of a suspension; (c) cooling the reaction mixture; (d) adding hexane; and (e) optionally isolating Form 1 of Lemborexant: succinic acid.

The present disclosure further relates to processes for preparation of form 1 of Lemborexant:succinic acid co-crystal.

In one embodiment, the disclosure relates to a process for preparation of Lemborexant:succinic acid co-crystal, comprising crystallising the Lemborexant:succinic acid co-crystal from a mixture of an organic solvent and an organic antisolvent. In an embodiment, the process for the preparation of Lemborexant:succinic acid co-crystal, comprises adding an antisolvent to a mixture comprising Lemborexant, succinic acid and at least one organic solvent.

The process may comprise the steps of:
(a) preparing a mixture comprising Lemborexant and succinic acid in at least one organic solvent;
(b) crystallizing the Lemborexant-succinic acid co-crystal by adding an antisolvent; and optionally
(c) isolating the Lemborexant:succinic acid co-crystal.

The organic solvent may be selected from a group consisting of: ketones, alcohols or aromatic hydrocarbons, such as a $C_{3-8}$ ketone, or a $C_{1-4}$ alcohol or a $C_7$-$C_{10}$ alkylbenzene, or a combination thereof. The organic solvent in step (a) may optionally be a $C_{3-8}$ ketone [such as acetone, diisopropylketone (DIPK), or methyl isobutyl ketone (MIBK), and particularly acetone]; a $C_{1-4}$ alcohol, (particularly, ethanol); or a $C_7$-$C_{10}$ alkyl benzene (particularly toluene), or a combination thereof. In embodiments of the disclosure, the solvent may be acetone, and the antisolvent may be hexane, or the solvent may be ethanol and the antisolvent may be hexane.

The mixture in step (a) may be at an elevated temperature optionally at a temperature of about 40° C. to about 90° C., about 40° C. to about 80° C., or about 50° C. to about 60° C.

The mixture in step (a) may be prepared by combining Lemborexant, succinic acid, and a solvent. The solvent to total solids (i.e. Lemborexant and succinic acid) ratio may be about 2 to about 25 ml per gram, about 3 to about 23, about 4 to about 20, about 5.5 to about 18 ml per gram, or about 5 to about 16 ml/g.

The mixture in step (a) may be prepared by combining, in any order, Lemborexant, succinic acid and the at least one organic solvent.

Alternatively, the mixture in step (a) may be prepared by combining a mixture of Lemborexant in at least one organic solvent, optionally at an elevated temperature, with a mixture of succinic acid in at least one organic solvent. The at least one organic solvent for the Lemborexant and for the succinic acid may be the same and may be any of the organic solvents as described above. Optionally the mixture of succinic acid and at least one organic solvent can be added to a mixture of Lemborexant and at least one solvent. The mixture of Lemborexant in the solvent, may be combined with the mixture of succinic acid in the solvent at an elevated temperature, optionally at a temperature of about 40° C. to about 90° C., about 50° C. to about 80° C. Optionally, the mixture of succinic acid is added to a solution of Lemborexant in the solvent. The solution of Lemborexant in the solvent may be heated to a temperature of about 40° C. to about 80° C., about 60° C. to about 75° C., about 55° C. to about 65° C., or about 45° C. to about 65° C.

Step (b) may optionally comprise cooling the mixture of Lemborexant, succinic acid and one or more solvents. Optionally, the cooling may be to a temperature of about −5° C. to about 15° C., about 0° C. to about 10° C. or about 2 to about 7° C., or about 5° C. The cooling may be carried out over a period of time of about 10 minutes to about 3 hours, about 30 minutes to about 2 hours, about 45 minutes to about 80 minutes, or about 60 minutes. Step (b) may alternatively or additionally comprise adding an antisolvent. The addition may be carried out after cooling. Optionally the addition is carried out dropwise. Optionally the antisolvent may be an alkane; optionally a $C_5$-$C_{10}$ alkane or cycloalkane; and preferably $C_5$-$C_8$ alkane or a cycloalkane, such as hexane or cyclohexane, and optionally hexane.

In any embodiment of the process disclosed herein, the ratio of antisolvent to solvent may be about 20:1 to about 1:2, about 15:1 to about 1:1, about 10:1 to about 2:1, or about 9:1 to about 2.3:1.

The resulting mixture may be stirred at a temperature of about −5° C. to about 15° C., about 0° C. to about 10° C., about 2 to about 8° C., or about 5° C. The stirring may be carried out for any suitable period of time, for example, about 10 minutes to about 48 hours, about 30 minutes to about 24 hours, or about 30 minutes to about 10 hours.

Step (c) may comprise filtering the Lemborexant:succinic acid from the mixture.

Crystalline form 1 of Lemborexant:succinic acid can be isolated by methods known in the art. For example, crystalline form 1 can be separated by filtering the slurry or decanting the solvent from the slurry. The isolating method can further comprise washing and drying steps.

The process for preparing form 1 of Lemborexant:succinic acid may further comprise a step of combining the form 1 of Lemborexant:succinic acid with at least one pharmaceutically acceptable excipient to form a pharmaceutical composition.

The present disclosure also encompasses the use of crystalline polymorphs of Lemborexant:succinic acid of the present disclosure for the preparation of pharmaceutical compositions of crystalline polymorph Lemborexant:succinic acid and/or crystalline polymorphs thereof.

The present disclosure also encompasses a crystalline product, optionally Form 1 of Lemborexant:succinic acid obtainable by a process as described in any aspect or embodiment of the disclosure herein.

The present disclosure encompasses pharmaceutical compositions comprising a crystalline product as described in any aspect or embodiment of the disclosure herein.

The present disclosure includes processes for preparing the above mentioned pharmaceutical compositions. The processes include combining any one or a combination of the crystalline polymorphs of Lemborexant:succinic acid of the present disclosure with at least one pharmaceutically acceptable excipient.

Pharmaceutical combinations or formulations of the present disclosure contain any one or a combination of the solid state forms of Lemborexant:succinic acid of the present disclosure. In addition to the active ingredient, the pharmaceutical formulations of the present disclosure can contain one or more excipients. Excipients are added to the formulation for a variety of purposes.

Diluents increase the bulk of a solid pharmaceutical composition, and can make a pharmaceutical dosage form containing the composition easier for the patient and caregiver to handle. Diluents for solid compositions include, for example, microcrystalline cellulose (e.g. Avicel®), microfine cellulose, lactose, starch, pregelatinized starch, calcium carbonate, calcium sulfate, sugar, dextrates, dextrin, dextrose, dibasic calcium phosphate dihydrate, tribasic calcium phosphate, kaolin, magnesium carbonate, magnesium oxide, maltodextrin, mannitol, polymethacrylates (e.g. Eudragit®), potassium chloride, powdered cellulose, sodium chloride, sorbitol, and talc.

Solid pharmaceutical compositions that are compacted into a dosage form, such as a tablet, can include excipients whose functions include helping to bind the active ingredient and other excipients together after compression. Binders for solid pharmaceutical compositions include acacia, alginic acid, carbomer (e.g. carbopol), carboxymethylcellulose sodium, dextrin, ethyl cellulose, gelatin, guar gum, hydrogenated vegetable oil, hydroxyethyl cellulose, hydroxypropyl cellulose (e.g. Klucel®), hydroxypropyl methyl cellulose (e.g. Methocel®), liquid glucose, magnesium aluminum silicate, maltodextrin, methylcellulose, polymethacrylates, povidone (e.g. Kollidon®, Plasdone®), pregelatinized starch, sodium alginate, and starch.

The dissolution rate of a compacted solid pharmaceutical composition in the patient's stomach can be increased by the addition of a disintegrant to the composition. Disintegrants include alginic acid, carboxymethylcellulose calcium, carboxymethylcellulose sodium (e.g. Ac-Di-Sol®, Primellose®), colloidal silicon dioxide, croscarmellose sodium, crospovidone (e.g. Kollidon®, Polyplasdone®), guar gum, magnesium aluminum silicate, methyl cellulose, microcrystalline cellulose, polacrilin potassium, powdered cellulose, pregelatinized starch, sodium alginate, sodium starch glycolate (e.g. Explotab®), and starch.

Glidants can be added to improve the flowability of a non-compacted solid composition and to improve the accuracy of dosing. Excipients that can function as glidants include colloidal silicon dioxide, magnesium trisilicate, powdered cellulose, starch, talc, and tribasic calcium phosphate.

When a dosage form such as a tablet is made by the compaction of a powdered composition, the composition is subjected to pressure from a punch and dye. Some excipients and active ingredients have a tendency to adhere to the surfaces of the punch and dye, which can cause the product to have pitting and other surface irregularities. A lubricant can be added to the composition to reduce adhesion and ease the release of the product from the dye. Lubricants include magnesium stearate, calcium stearate, glyceryl monostearate, glyceryl palmitostearate, hydrogenated castor oil, hydrogenated vegetable oil, mineral oil, polyethylene glycol, sodium benzoate, sodium lauryl sulfate, sodium stearyl fumarate, stearic acid, talc, and zinc stearate.

Flavoring agents and flavor enhancers make the dosage form more palatable to the patient. Common flavoring agents and flavor enhancers for pharmaceutical products that can be included in the composition of the present disclosure include maltol, vanillin, ethyl vanillin, menthol, citric acid, fumaric acid, ethyl maltol, and tartaric acid.

Solid and liquid compositions can also be dyed using any pharmaceutically acceptable colorant to improve their appearance and/or facilitate patient identification of the product and unit dosage level.

In liquid pharmaceutical compositions of the present invention, Lemborexant: succinic acid and any other solid excipients can be dissolved or suspended in a liquid carrier such as water, vegetable oil, alcohol, polyethylene glycol, propylene glycol, or glycerin.

Liquid pharmaceutical compositions can contain emulsifying agents to disperse uniformly throughout the composition an active ingredient or other excipient that is not soluble in the liquid carrier. Emulsifying agents that can be useful in liquid compositions of the present invention include, for example, gelatin, egg yolk, casein, cholesterol, acacia, tragacanth, chondrus, pectin, methyl cellulose, carbomer, cetostearyl alcohol, and cetyl alcohol.

Liquid pharmaceutical compositions of the present invention can also contain a viscosity enhancing agent to improve the mouth-feel of the product and/or coat the lining of the gastrointestinal tract. Such agents include acacia, alginic acid bentonite, carbomer, carboxymethylcellulose calcium or sodium, cetostearyl alcohol, methyl cellulose, ethylcellulose, gelatin guar gum, hydroxyethyl cellulose, hydroxypropyl cellulose, hydroxypropyl methyl cellulose, maltodextrin, polyvinyl alcohol, povidone, propylene carbonate, propylene glycol alginate, sodium alginate, sodium starch glycolate, starch tragacanth, xanthan gum and combinations thereof.

Sweetening agents such as sorbitol, saccharin, sodium saccharin, sucrose, aspartame, fructose, mannitol, and invert sugar can be added to improve the taste.

Preservatives and chelating agents such as alcohol, sodium benzoate, butylated hydroxyl toluene, butylated hydroxyanisole, and ethylenediamine tetraacetic acid can be added at levels safe for ingestion to improve storage stability.

According to the present disclosure, a liquid composition can also contain a buffer such as gluconic acid, lactic acid, citric acid, or acetic acid, sodium gluconate, sodium lactate, sodium citrate, or sodium acetate. Selection of excipients and the amounts used can be readily determined by the formulation scientist based upon experience and consideration of standard procedures and reference works in the field.

The solid compositions of the present disclosure include powders, granulates, aggregates, and compacted compositions. The dosages include dosages suitable for oral, buccal, rectal, parenteral (including subcutaneous, intramuscular, and intravenous), inhalant, and ophthalmic administration. Although the most suitable administration in any given case will depend on the nature and severity of the condition being treated, in embodiments the route of administration is oral. The dosages can be conveniently presented in unit dosage form and prepared by any of the methods well-known in the pharmaceutical arts.

Dosage forms include solid dosage forms like tablets, powders, capsules, suppositories, sachets, troches, and lozenges, as well as liquid syrups, suspensions, and elixirs.

The dosage form of the present disclosure can be a capsule containing the composition, such as a powdered or granulated solid composition of the disclosure, within either a hard or soft shell. The shell can be made from gelatin and optionally contain a plasticizer such as glycerin and/or sorbitol, an opacifying agent and/or colorant.

The active ingredient and excipients can be formulated into compositions and dosage forms according to methods known in the art.

A composition for tableting or capsule filling can be prepared by wet granulation. In wet granulation, some or all of the active ingredients and excipients in powder form are blended and then further mixed in the presence of a liquid, typically water, that causes the powders to clump into granules. The granulate is screened and/or milled, dried, and then screened and/or milled to the desired particle size. The granulate can then be tableted, or other excipients can be added prior to tableting, such as a glidant and/or a lubricant.

A tableting composition can be prepared conventionally by dry blending. For example, the blended composition of the actives and excipients can be compacted into a slug or a sheet and then comminuted into compacted granules. The compacted granules can subsequently be compressed into a tablet.

As an alternative to dry granulation, a blended composition can be compressed directly into a compacted dosage form using direct compression techniques. Direct compression produces a more uniform tablet without granules. Excipients that are particularly well suited for direct compression tableting include microcrystalline cellulose, spray dried lactose, dicalcium phosphate dihydrate, and colloidal silica. The proper use of these and other excipients in direct compression tableting is known to those in the art with experience and skill in particular formulation challenges of direct compression tableting.

A capsule filling of the present disclosure can include any of the aforementioned blends and granulates that were described with reference to tableting, but they are not subjected to a final tableting step.

A pharmaceutical formulation of Lemborexant:succinic acid can be administered. Lemborexant:succinic acid may be formulated for administration to a mammal, in embodiments to a human, by injection. Lemborexant:succinic acid can be formulated, for example, as a viscous liquid solution or suspension, such as a clear solution, for injection. The formulation can contain one or more solvents. A suitable solvent can be selected by considering the solvent's physical and chemical stability at various pH levels, viscosity (which would allow for syringeability), fluidity, boiling point, miscibility, and purity. Suitable solvents include alcohol USP, benzyl alcohol NF, benzyl benzoate USP, and Castor oil USP. Additional substances can be added to the formulation such as buffers, solubilizers, and antioxidants, among others. Ansel et al., Pharmaceutical Dosage Forms and Drug Delivery Systems, 7th ed.

The crystalline polymorphs of Lemborexant:succinic acid and the pharmaceutical compositions and/or formulations of Lemborexant:succinic acid of the present disclosure can be used as medicaments, in embodiments in the treatment of sleep-wake disorders, including insomnia and/or Irregular Sleep-Wake Rhythm Disorder (ISWRD) associated with Alzheimer's disease/dementia.

The present disclosure also provides methods of treating sleep-wake disorders, including insomnia and/or Irregular Sleep-Wake Rhythm Disorder (ISWRD) associated with Alzheimer's disease/dementia by administering a therapeutically effective amount of any one or a combination of the crystalline polymorphs of Lemborexant:succinic acid of the present disclosure, or at least one of the above pharmaceutical compositions and/or formulations, to a subject in need of the treatment.

Having thus described the disclosure with reference to particular preferred embodiments and illustrative examples, those in the art can appreciate modifications to the disclosure as described and illustrated that do not depart from the spirit and scope of the disclosure as disclosed in the specification. The Examples are set forth to aid in understanding the disclosure but are not intended to, and should not be construed to limit its scope in any way.

Further aspects and embodiments of the present disclosure are set out in the numbered clauses below:

1. Crystalline Lemborexant:succinic acid.
2. Crystalline Lemborexant:succinic acid which is a co-crystal.
3. Crystalline Lemborexant succinate.
4. A crystalline product according to Clause 1, 2, or 3, designated Form 1, which is characterized by data selected from one or more of the following:
   a. an XRPD pattern having peaks at 7.4, 8.4, 9.2, 14.0 and 17.1 degrees 2-theta±0.2 degrees 2-theta;
   b. an XRPD pattern as depicted in FIG. 1; and
   c. combinations of these data.
5. A crystalline product according to any of Clauses 1, 2, 3 or 4, designated Form 1, characterized by the XRPD pattern having peaks at 7.4, 8.4, 9.2, 14.0 and 17.1 degrees 2-theta±0.2 degrees 2-theta, and also having one, two, three or four additional peaks selected from 11.2, 14.9, 18.4, 20.6 and 24.4; degrees two theta±0.2 degrees two theta.
6. A crystalline product according to any of Clauses 1, 2, 3, 4 or 5, designated Form 1, wherein the crystalline form is anhydrous.
7. A crystalline product according to any of Clauses 1, 2, 3, 4, 5 or 6, designated Form 1, which contains: no more than about 20%, no more than about 10%, no more than about 5%, no more than about 2%, no more than about 1% or about 0% of any other crystalline forms of Lemborexant:succinic acid or crystalline Lemborexant succinate.
8. A crystalline product according to any of Clauses 1, 2, 3, 4, 5 6, or 7 designated Form 1, which contains: no more than about 20%, no more than about 10%, no more than about 5%, no more than about 2%, no more than about 1% or about 0% of amorphous Lemborexant:succinic acid or Lemborexant succinate.
9. A process for preparing the crystalline product of any of Clauses 1, 2, 3, 4, 5, 6, 7, or 8, comprising crystallising Lemborexant:succinic acid from a solution comprising Lemborexant and succinic acid in at least one organic solvent, optionally by cooling and/or addition of an antisolvent.
10. A process according to Clause 9, comprising adding an antisolvent to a mixture comprising Lemborexant, succinic acid and at least one organic solvent.
11. A process according to Clause 9 or Clause 10, comprising:
   (a) preparing a mixture comprising Lemborexant and succinic acid in at least one organic solvent,
   (b) crystallizing the Lemborexant-succinic acid co-crystal by adding an antisolvent; and optionally
   (c) isolating the Lemborexant:succinic acid co-crystal.
12. A process according to any one of clauses 9, 10 or 11, comprising:
   a) providing a solution of Lemborexant in one or more polar solvents; (b) adding succinic acid optionally in the form of a suspension; (c) cooling the reaction mixture; (d) adding an anti-solvent; and (e) optionally isolating Form 1 of Lemborexant:succinic acid.
13. A process according to any one of Clauses 11 or 12, wherein the solvent in step (a) is selected from a group consisting of: ketones, alcohols or aromatic hydrocarbons, or a combination thereof; optionally wherein the organic solvent is selected from $C_{3-8}$ ketone, or a $C_{1-4}$ alcohol or a $C_7$-$C_{10}$alkylbenzene, or a combination thereof; or wherein the organic solvent is acetone, diisopropylketone, methylisobutyl ketone, ethanol, or toluene; or wherein the organic solvent is acetone or ethanol, or a mixture thereof.

14. A process according to any one of Clauses 11, 12 or 13, wherein the solvent is in step (a) is a ketone.

15. A process according to clause 14 wherein the solvent is acetone.

16. A process according to any one of clauses 11, 12, 13, 14, or 15, wherein step (a) is performed with heating.

17. A process according to any one of clauses 12, 13, 14, 15, or 16, wherein succinic acid is added in the form of a suspension in a polar solvent, optionally wherein the solvent is the same as the solvent in step (a).

18. The process according to any of clauses 13, 14 or 15, wherein the solvent is acetone or ethanol.

19. The process according to any one of clauses 9, 10, 11, 12, 13, 14, 15, or 16, wherein the anti-solvent is an aprotic solvent.

20. The process according to any one of clauses 9, 10, 11, 12, 13, 14, 15, 16, 17, 18 or 19, wherein the antisolvent is selected from an alkane or cycloalkane; optionally wherein the antisolvent is selected from the group consisting of: $C_5$-$C_{10}$ alkanes or $C_6$-$C_{10}$ cycloalkanes; or $C_5$-$C_8$ alkanes or $C_6$-$C_8$ cycloalkanes; optionally wherein the antisolvent is hexane or cyclohexane.

21. The process according to any one of clauses 9, 10, 11, 12, 13, 14, 15, 16, 17, 18, 19, or wherein the anti-solvent is hexane.

22. A process according to any of Clauses 9, 10, 11, 12, 13, 14, 15, 16, 17, 18, 19, 20, or 21, further comprising combining the crystalline product with at least one pharmaceutically acceptable excipient to provide a pharmaceutical composition.

23. A crystalline product obtainable by a process according to any of Clauses 9, 10, 11, 12, 13, 14, 15, 16, 17, 18, 19, 20, 21 or 22.

24. A pharmaceutical composition comprising a crystalline product according to any of Clauses 1-8 or 23, and at least one pharmaceutically acceptable excipient.

25. Use of a crystalline product according to any of Clauses 1-8 or 23 for the preparation of a pharmaceutical composition and/or formulation.

26. A process for preparing the pharmaceutical composition according to Clause 24, comprising combining a crystalline product according to any of Clauses 1-8 or 23 with at least one pharmaceutically acceptable excipient.

27. A crystalline product according to any of Clauses 1-8 or 23, or a pharmaceutical composition according to Clause 24, for use as a medicament.

28. A crystalline product according to any of Clauses 1-8 or 23, or a pharmaceutical composition according to Clause 24, for use in the treatment of sleep-wake disorders, including insomnia and/or Irregular Sleep-Wake Rhythm Disorder (ISWRD) associated with Alzheimer's disease/dementia.

29. A method of treating sleep-wake disorders, including insomnia and/or Irregular Sleep-Wake Rhythm Disorder (ISWRD) associated with Alzheimer's disease/dementia, comprising administering a therapeutically effective amount of a crystalline product according to any of Clauses 1-8 or 23, or a pharmaceutical composition according to Clause 24, to a subject in need of the treatment.

30. Use of a crystalline product according to any of Clauses 1-8 or 23, in the preparation of another solid state form of Lemborexant:succinic acid or Lemborexant succinate.

31. A process for preparing a solid state form of Lemborexant:succinic acid or Lemborexant succinate comprising preparing a crystalline product according to any one of Clauses 1-8 or 23, and converting it to another a solid state form thereof.

Powder X-Ray Diffraction ("XRPD") Method

Powder X-ray Diffraction was performed on an X-Ray powder diffractometer PanAlytical X'pert Pro; CuKα radiation (λ=1.54187 Å); X'Celerator detector with active length 2.122 degrees 2-theta; laboratory temperature 25±3° C.; zero background sample holders. Prior to analysis, the samples were gently ground using a mortar and pestle to obtain a fine powder. The ground sample was adjusted into a cavity of the sample holder and the surface of the sample was smoothed using a cover glass.

Measurement Parameters:

| | |
|---|---|
| Scan range: | 3-40 degrees 2-theta |
| Scan mode: | continuous |
| Step size: | 0.0167 degrees |
| Step size: | 42 s |
| Sample spin: | 60 rpm |
| Sample holder: | zero background silicon plate |

$^{13}$C CP/MAS NMR Method:

$^{13}$C CP/MAS NMR spectra were measured at 125 MHz using Bruker Avance III 500 WB/US NMR spectrometer (Karlsruhe, Germany, 2003) at magic angle spinning (MAS) frequency $\omega_r/2\pi$=12 kHz. In all cases finely powdered samples were placed into 4-mm $ZrO_2$ rotors and the standard "cpmas" pulse program was used. During acquisition of the data the high-power dipolar decoupling "TPPM" (two-pulse phase-modulated) was applied. The number of scans was 128, recycle delay was 60.0 s, contact time 2 ms. Taking into account frictional heating of the samples during fast rotation all NMR experiments were performed at 293 K (precise temperature calibration was performed).

The $^{13}$C scale was calibrated with glycine as external standard (176.03 ppm).

$^{15}$N CP/MAS NMR Method:

$^{15}$N CP/MAS NMR spectra were measured at 50.7 MHz using Bruker Avance III 500 WB/US NMR spectrometer (Karlsruhe, Germany, 2003) at magic angle spinning (MAS) frequency $\omega_r/2\pi$=10 kHz. In all cases finely powdered samples were placed into 4-mm $ZrO_2$ rotors and the standard "cpmas" pulse program was used. During acquisition of the data the high-power dipolar decoupling "TPPM" (two-pulse phase-modulated) was applied. The number of scans was 6144, recycle delay was 80.0 s and contact time 7 ms. Taking into account frictional heating of the samples during fast rotation all NMR experiments were performed at 300 K (precise temperature calibration was performed).

$^{15}$N NMR scale was referenced to glycine (34.35 ppm).

Ft-IR Method:

| | |
|---|---|
| Equipment: | Nicolet 380 FT-IR Spectrometer |
| Mode: | Total internal reflection (ATR); |
| Spectral range: | 4000-550 $cm^{-1}$; |

-continued

| | |
|---|---|
| Sample gain: | 1.0; |
| Number of scans: | 128; |
| Resolution: | 4.0 cm$^{-1}$. |

HPLC Method Used for Purity Analysis of Example 4 and 5

| | |
|---|---|
| Column: | Symmetry C18 |
| Column dim. [mm]: | 100 × 4.6 |
| Column temp. [° C.]: | 25 |
| Detection UV [nm]: | 210 |
| Particle size [µm]: | 3.5 |
| Flow-rate [ml/min]: | 1.0 |
| Sample temp. [° C.]: | 20 |
| Injection volume [µl]: | 2 |
| Mobile phase | Solvent A: 0.1% H$_3$PO$_4$ |
| | Solvent B: MeCN |

| | time (min) | % A | % B |
|---|---|---|---|
| Gradient | 0.0 | 95 | 5 |
| | 2.0 | 95 | 5 |
| | 7.0 | 63 | 37 |
| | 15.0 | 40 | 60 |
| | 17.0 | 10 | 90 |
| | 19.0 | 10 | 90 |
| | 19.1 | 95 | 5 |
| | 22.0 | 95 | 5 |

| | |
|---|---|
| Diluent | 50% MeCN; MeCN (LMBM015) |
| Blank | diluent |
| ID solution | — |
| Sample solution | 0.8 mg/ml |

EXAMPLES

Preparation of Starting Materials

Lemborexant can be prepared according to methods known from the literature, for example according to example 95 of International Publication No. WO 2012/039371 A1.

Example 1: Preparation of Lemborexant:Succinic Acid

Lemborexant (100 mg) was dissolved in acetone (1.5 ml) while heating to a temperature of about 50° C. Suspension of succinic acid (31 mg) in acetone (0.5 ml) was added and the obtained clear solution was cooled down to 5° C. over a period of about 1 hour. Then 5 ml of hexane was added and suspension was formed. The solid was filtered and dried at RT under vacuum for about 10 minutes. The obtained solid was analyzed by)(RFD, and the obtained XRPD pattern is presented in FIG. 1.

Example 2: Preparation of Crystalline Form 1 of Lemborexant:Succinic Acid

Lemborexant base (3 grams) was suspended in 30 ml of ethanol, suspension was heated up to 60° C. during 30 minutes and held at that temperature until dissolved. Solution of succinic acid (900 mg) in ethanol (15 ml) was added to the clear solution of Lemborexant base. The solution was cooled down to a temperature of about 5° C. during a period of about 60 minutes. Hexane (120 ml) was added and crystals came out in minutes. The mixture was stirred overnight at a temperature of about 5° C., filtered and dried under vacuum. The obtained solid was analyzed by XRPD and identified as Lemborexant:succinic acid co-crystal form 1.

Example 3: Unit Cell Dimensions

X-ray powder diffraction analysis was performed on Form 1 to determine its crystal system and unit cell dimensions. Form 1 has P21 unit cell with lattice dimensions: a=10.528 Å, b=23.814 Å, c=5.1173 Å, angle β=90.695°, and V=1283 Å$^3$. The unit cell parameters were determined using the Le Bail method using program Highscore.

Example 4: Preparation of Crystalline Form 1 of Lemborexant:Succinic Acid

Procedure A

Lemborexant (300 mg; 89.93%) was dissolved in EtOH (3.3 ml) by heating to 50° C. Solution of succinic acid (96 mg, 1.1 eq.) in EtOH (1.2 ml) was added, clear solution was stirring for 15 minutes. Solution was cooled down to 5° C. during 60 minutes. Hexane (36 ml) was added dropwise. Crystals came out and suspension was stirred for 3 hours at 5° C. The crystalline phase was separated by filtration. The cake was dried up on the filter at room temperature during 15 minutes. Yield 170 mg (44%). The obtained material was analyzed by XRPD and identified as form 1 of Lemborexant: succinic acid (HPLC 98.86%).

Procedure B

Lemborexant (2 grams, HPLC 99.02%) was dissolved in EtOH (40 ml) by heating to Clear solution was cooled down to 50° C. during 10 minutes. Solution of succinic acid (590 mg, 1.02 eq.) in EtOH (10 ml) was added, clear solution was stirred for 15 minutes. Volume was reduced by evaporation from 43 g to 14.5 g. Solution was cooled down from 50° C. to 5° C. during minutes. Hexane (60 ml) was added dropwise. Crystals came out and suspension was stirred overnight at 5° C. The crystalline phase was separated by filtration. The cake was dried up on the filter at room temperature under vacuum during 30 minutes. Yield 1.67 g (65%). The obtained material was analyzed by XRPD and identified as form 1 of Lemborexant:succinic acid (HPLC 99.24%).

What is claimed is:

1. A crystalline form of Lemborexant:succinic acid.

2. A crystalline form according to claim 1, wherein the ratio between Lemborexant and the succinic acid is between 1:1.5 and 1.5:1.

3. A crystalline product according to claim 1, which is characterized by data selected from one or more of the following:
   (a) an XRPD pattern having peaks at 7.4, 8.4, 9.2, 14.0 and 17.1 degrees 2-theta±0.2 degrees 2-theta;
   (b) an XRPD pattern as depicted in FIG. 1;
   (c) an XRPD pattern having peaks at 7.4, 8.4, 9.2, 14.0 and 17.1 degrees 2-theta±0.2 degrees 2-theta, and also having one, two, three, four or five additional peaks selected from 11.2, 14.9, 18.4, 20.6 and 24.4 degrees two theta±0.2 degrees two theta;
   (d) an X-ray powder diffraction pattern having peaks at 7.4, 8.4, 9.2, 11.2, 14.0, 14.9, 17.1, 18.4, 20.6 and 24.4 degrees 2-theta±0.2 degrees 2-theta;
   (e) an X-ray powder diffraction pattern having peaks at 7.4, 8.4, 9.2, 11.2, 14.0, 14.9, 17.1, 17.7, 18.4, 18.9, 19.5, 19.7, 20.2, 20.6, 22.4, 22.9, 24.0, 24.4, 25.2, 25.5, 26.5, 27.0, 27.5, 27.8, 28.4, 28.7 and 29.7 degrees 2-theta±0.2 degrees 2-theta;

(f) a solid state 13C NMR spectrum with characteristic peaks at 177.4, 158.6, 149.3, 124.0 and 114.5 ppm±0.2 ppm;

(g) a solid state $^{13}$C NMR spectrum having the following chemical shift absolute differences from reference peak at 108.8 ppm±1 ppm: 68.6, 49.8, 40.5, 15.2 and 5.7 ppm±0.1 ppm;

(h) a solid state $^{13}$C NMR spectrum substantially as depicted in FIG. 2, 3, or 4;

(i) a solid state $^{15}$N NMR spectrum with characteristic peaks at 144.6, 265.1, 269.8 and 301.6 ppm±0.2 ppm (j) a solid state $^{15}$N NMR spectrum substantially as depicted in FIG. 5;

(k) the following unit cell data:
cell_length_a 10.53 Å
cell_length_b 23.81 Å
cell_length_c 5.12 Å
cell_angle_beta 90.695°
Symmetry space group name P2$_1$.

4. A crystalline product according to claim 1, wherein the crystalline form is an anhydrous form.

5. A crystalline product according to claim 1, which contains no more than about 20% of any other crystalline forms of Lemborexant:succinic acid or Lemborexant succinate.

6. A crystalline product according to claim 1, which contains no more than about 20% of amorphous Lemborexant:succinic acid or Lemborexant succinate.

7. A pharmaceutical composition comprising a crystalline product according to claim 1 and at least one pharmaceutically acceptable excipient.

8. A process for preparing a pharmaceutical composition comprising combining a crystalline product according to claim 1, with at least one pharmaceutically acceptable excipient.

9. A medicament comprising a crystalline product according to claim 1.

10. A method of treating insomnia and/or Irregular Sleep-Wake Rhythm Disorder (ISWRD) associated with Alzheimer's disease or dementia, comprising administering a therapeutically effective amount of a crystalline product according to claim 1 to a subject in need of the treatment.

11. A process for preparing a Lemborexant salt or a solid state form thereof, comprising preparing a crystalline product of claim 1, and converting it to another solid state form of Lemborexant, or another Lemborexant salt or a solid state form thereof.

12. A crystalline form of Lemborexant:succinic acid wherein the crystalline form is a co-crystal.

* * * * *